(12) United States Patent
Orgill et al.

(10) Patent No.: US 10,542,731 B2
(45) Date of Patent: Jan. 28, 2020

(54) BREATHER CAP ASSEMBLY

(71) Applicant: CTB, Inc., Milford, IN (US)

(72) Inventors: Michael Allen Orgill, Goshen, IN (US); Christopher Richard Roes, Cromwell, IN (US); Roger Steven Kiphart, Warsaw, IN (US); Grant Alexander White, Kewanna, IN (US)

(73) Assignee: CTB, INC., Milford, IN (US)

( * ) Notice: Subject to any disclaimer, the term of this patent is extended or adjusted under 35 U.S.C. 154(b) by 0 days.

(21) Appl. No.: 15/486,900

(22) Filed: Apr. 13, 2017

(65) Prior Publication Data

US 2017/0215389 A1 Aug. 3, 2017

Related U.S. Application Data

(63) Continuation-in-part of application No. 14/520,792, filed on Oct. 22, 2014, now abandoned, which is a continuation of application No. 13/534,294, filed on Jun. 27, 2012, now Pat. No. 8,904,962.

(51) Int. Cl.
*A01K 39/02* (2006.01)
*A01K 7/02* (2006.01)

(52) U.S. Cl.
CPC ............ *A01K 39/0213* (2013.01); *A01K 7/02* (2013.01)

(58) Field of Classification Search
CPC ... A01K 7/00; A01K 7/02; A01K 7/04; A01K 39/02; A01K 39/024
See application file for complete search history.

(56) References Cited

U.S. PATENT DOCUMENTS

| | | |
|---|---|---|
| 4,047,503 A | 9/1977 | Wilmot |
| 4,187,804 A | 2/1980 | von Taschitzki |
| 4,392,584 A | 7/1983 | Bauer |
| 4,457,325 A | 7/1984 | Green |
| 4,640,304 A | 2/1987 | Looney |
| 4,655,247 A | 4/1987 | Westra et al. |
| 4,660,509 A | 4/1987 | Stuedler, Jr. |
| 4,736,863 A | 4/1988 | Harris |
| 4,844,414 A | 7/1989 | Sable et al. |
| 4,886,019 A | 12/1989 | Davis et al. |
| 4,945,947 A | 8/1990 | Westra et al. |

(Continued)

FOREIGN PATENT DOCUMENTS

| | | |
|---|---|---|
| CA | 2788371 | 7/2014 |
| GB | 2204380 A | 11/1988 |

*Primary Examiner* — Lisa L Tsang
(74) *Attorney, Agent, or Firm* — Clark Hill PLC

(57) ABSTRACT

A breather cap assembly is configured to be connected to a stand-tube used in a watering system. When the watering system is in normal operation, the breather cap assembly is configured to allow for air to flow between the outside the assembly and the stand-tube. The breather cap assembly also provides for structure which acts as a baffle to minimize the introduction of foreign material from outside the breather cap assembly into the stand-tube. When the watering system is in flushing operation, the breather cap assembly is configured to seal off the stand-tube in order to minimize the possibility of water leaving the stand-tube. The breather cap assembly further also provides for structure which acts as a baffle to collect and retain a majority of any water that does leave the stand-tube during a flushing operation.

15 Claims, 10 Drawing Sheets

(56) References Cited

U.S. PATENT DOCUMENTS

| | | | |
|---|---|---|---|
| 5,136,983 A | 8/1992 | Hostetler et al. | |
| 6,202,678 B1 | 3/2001 | Hawkins | |
| 6,901,881 B2 | 6/2005 | Pollock et al. | |
| 7,194,857 B2 | 3/2007 | Hung | |
| 7,318,556 B2 | 1/2008 | Lee et al. | |
| 7,416,223 B1 | 8/2008 | Sulmone | |
| 7,762,273 B2 | 7/2010 | Bottura | |
| 7,810,787 B2 | 10/2010 | Johnson | |
| D708,402 S | 7/2014 | Orgill et al. | |
| 8,904,962 B2 | 12/2014 | Orgill et al. | |
| 2003/0062371 A1* | 4/2003 | Hirao | B60T 11/22 220/374 |
| 2011/0067392 A1 | 3/2011 | Cella et al. | |

* cited by examiner

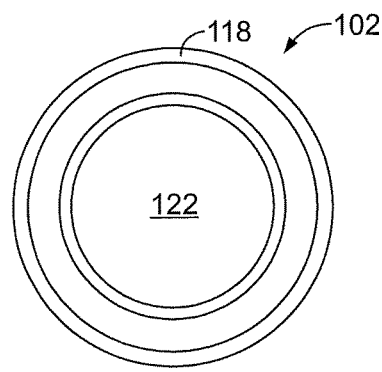
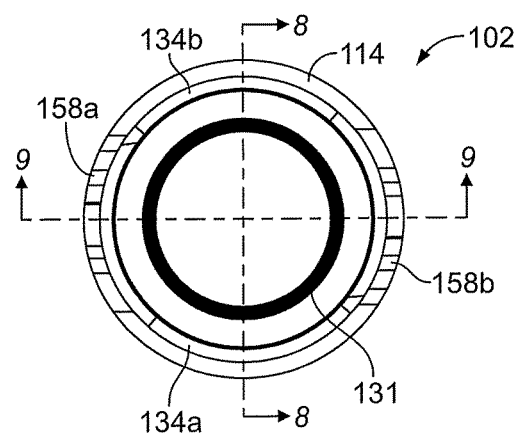
FIG. 6    FIG. 7
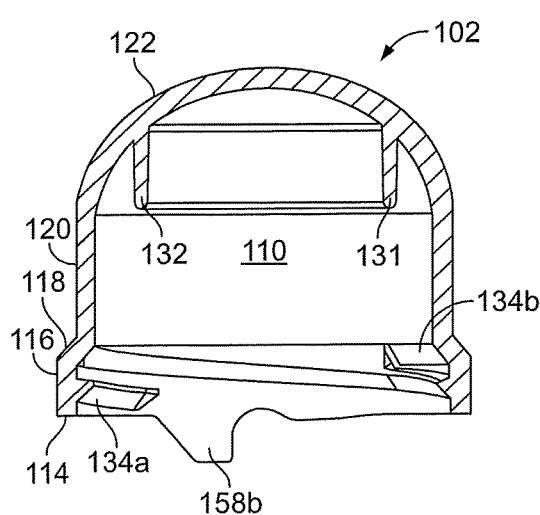
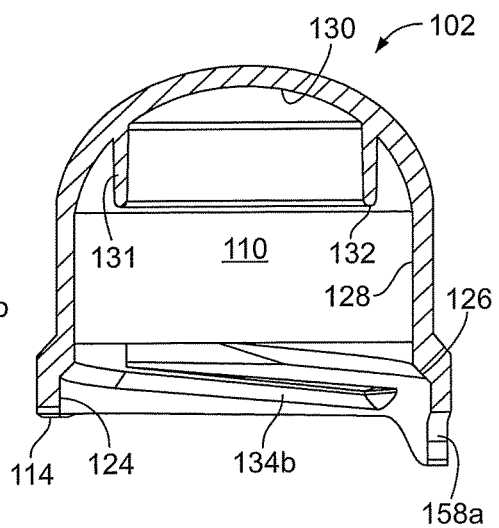
FIG. 8    FIG. 9

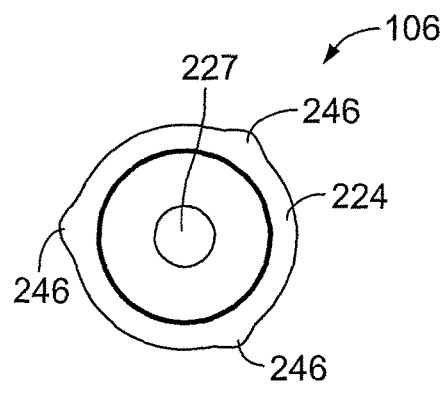 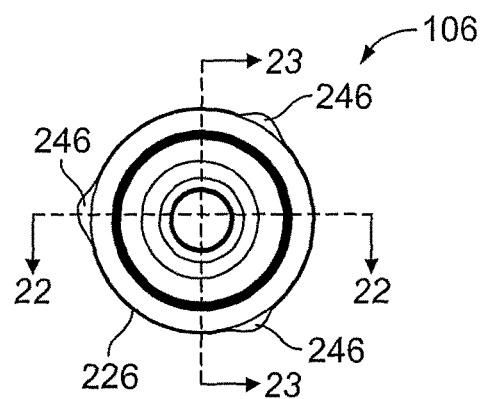
FIG. 19         FIG. 20
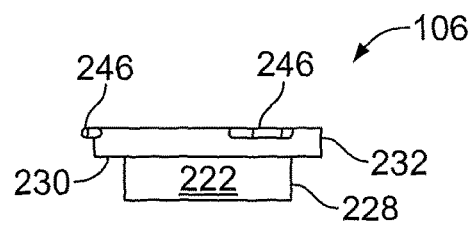
FIG. 21
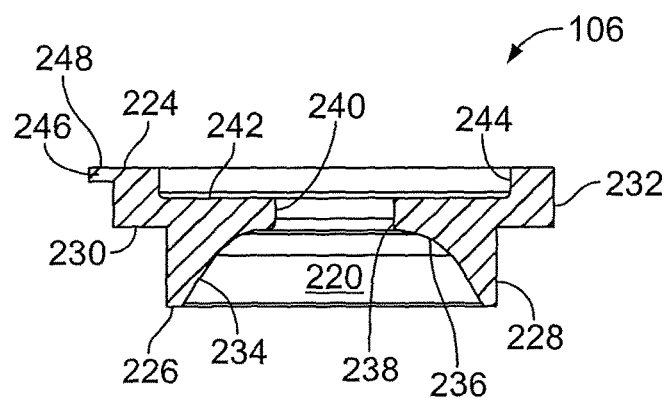 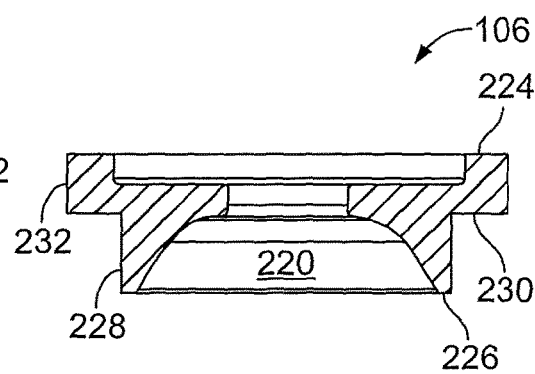
FIG. 22         FIG. 23

BREATHER CAP ASSEMBLY

CROSS-REFERENCE AND INCORPORATION BY REFERENCE

This patent application is a continuation-in-part of U.S. patent application Ser. No. 14/520,792 filed Oct. 22, 2014, and entitled "Breather Cap Assembly" which was a continuation of U.S. patent application Ser. No. 13/534,294, filed Jun. 27, 2012, and entitled "Breather Cap Assembly". U.S. patent application Ser. Nos. 13/534,294 and 14/520,792 are hereby incorporated by reference in their entirety.

FIELD OF THE INVENTION

The invention relates to a breather cap assembly for use in connection with a watering assembly. More specifically, the invention relates to a breather cap assembly for use in connection with a nipple drinker watering assembly used by poultry and other small animals.

BACKGROUND OF THE INVENTION

Nipple drinker watering systems are commonly used to provide water to poultry and other small animals. These watering systems involve the use of several branching water supply lines extending the interior length of a house, such as a poultry house. The water supply lines have numerous nipple drinkers attached thereto so that the poultry may obtain water by pecking at the nipples. Stand-tubes are typically provided at various locations along the length of the water supply lines, typically proximate to pressure regulators. The stand-tubes are generally clear and provide a visual indication, with the assistance of a float provided in the stand-tube, of the water pressure level (via water column) in the water supply line at their locations. In order to be effective, the stand-tubes must be able to vent to the outside environment.

Periodically, it may be necessary to flush the nipple drinker watering systems in order to clean out the watering system as material may build up in the watering lines over time due to, for instance, the introduction of sediment from the water source itself or from growers adding material to the water source, such as chlorine or medication. Such build-up of material in the watering system can interfere with proper water flow along the water supply line and may eventually contribute to the malfunction of the nipple drinkers. It may also be necessary to flush the nipple drinker watering systems in order to remove warmer water from the watering system. Removal of warm water from the watering system in order to replace it with cooler water has been found to increase consumption of water by poultry.

Due to the need to flush the systems, the stand-tubes have been outfitted with caps designed to try and prevent leakage out of the stand-tubes during a flushing operation, as well as to prevent the floats from being blown out of the stand-tubes in view of the increased water pressure in the system caused by the flushing. One example of such a cap is shown and described in U.S. Pat. No. 5,136,983. This cap, as well as others, however, have had their own problems. For instance, some caps have had problems with air lock being caused by the seal being formed when it should be allowing air to pass. Other caps have had problems with still allowing leakage to occur after the seal is formed. Other caps have had problems with forming the seal at lower water pressures (e.g., the seal may be formed in caps provided closer to the water source, where the water pressure is typically higher, but not in caps provided distal from the water source, where the water pressure is typically lower). Other caps have designs which allow for air flow both in and out of the assembly, but which allows for unwanted particles to enter the assembly which can cause contamination of the water and which can creates blockages in the cap, thereby potentially causing it to malfunction.

In view of the foregoing, there is a need for a breather cap assembly which overcomes all of the disadvantages of the prior art caps.

SUMMARY OF THE INVENTION

Briefly, the preferred embodiment of the invention provides for a breather cap assembly which is intended to be associated with a hollow stand-tube of a watering system. The breather cap assembly includes a body, a seal, a cap and a valve. The body has an upper portion, a lower portion, and an aperture which extends therethrough. The lower portion is configured to be connected to the hollow stand-tube proximate to a free end thereof and the upper portion has a generally V-shaped configuration. The seal has an aperture provided therethrough and is positioned within the aperture of the lower portion of the body such that the aperture of the seal is in fluid communication with the aperture of the upper portion of the body. The cap surrounds the upper portion of the body and is secured to the lower portion of the body. The cap has a flange extending inwardly therefrom toward the upper portion of the body. The cap is positioned relative to the body to allow for air flow there between such that air can flow from outside of the breather cap assembly, between the cap and the body, into and through the aperture of the upper portion of the body, into and through the aperture of the seal, and into the hollow stand-tube, and vice-versa. A valve which is positioned within the hollow stand-tube and is configured to float in the water within the hollow stand-tube in order to provide a visual indication of a height of the water in the hollow stand-tube. The valve is further configured to seal the aperture of the seal in order to minimize the possibility of water escaping out of the hollow stand-tube when the height of the water within the hollow stand-tube rises, thereby further preventing air flow from between the outside of the breather cap assembly and the hollow stand-tube. The upper portion of the body is generally V-shaped in configuration in order to collect water that may enter the aperture of the upper portion of the body prior to the valve sealing the aperture of the seal. The flange of the cap is provided in order to minimize the exit of water from the breather cap assembly that moved beyond the aperture of the upper portion of the body and to redirect such water back into the aperture of the upper portion of the body.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 6 is a top view of the cap of the breather cap assembly of the invention;

FIG. 7 is a bottom view of the cap of the breather cap assembly of the invention;

FIG. 8 is a cross-sectional view of the cap taken along line 8-8 of FIG. 7;

FIG. 9 is a cross-sectional view of the cap taken along line 9-9 of FIG. 7;

FIG. 19 is a top view of a seal of the breather cap assembly of the invention;

FIG. 20 is a bottom view of the seal of the breather cap assembly of the invention;

FIG. 21 is a side view of the seal of the breather cap assembly of the invention;

FIG. 22 is a cross-sectional view of the seal taken along line 22-22 of FIG. 20;

FIG. 23 is a cross-sectional view of the seal taken along line 23-23 of FIG. 20;

FIG. 30 is a cross-sectional view of the breather cap assembly of the invention that is connected to a stand tube with the nipple drinker watering system being in a flush mode.

DETAILED DESCRIPTION OF THE ILLUSTRATED EMBODIMENT

Figure 1:
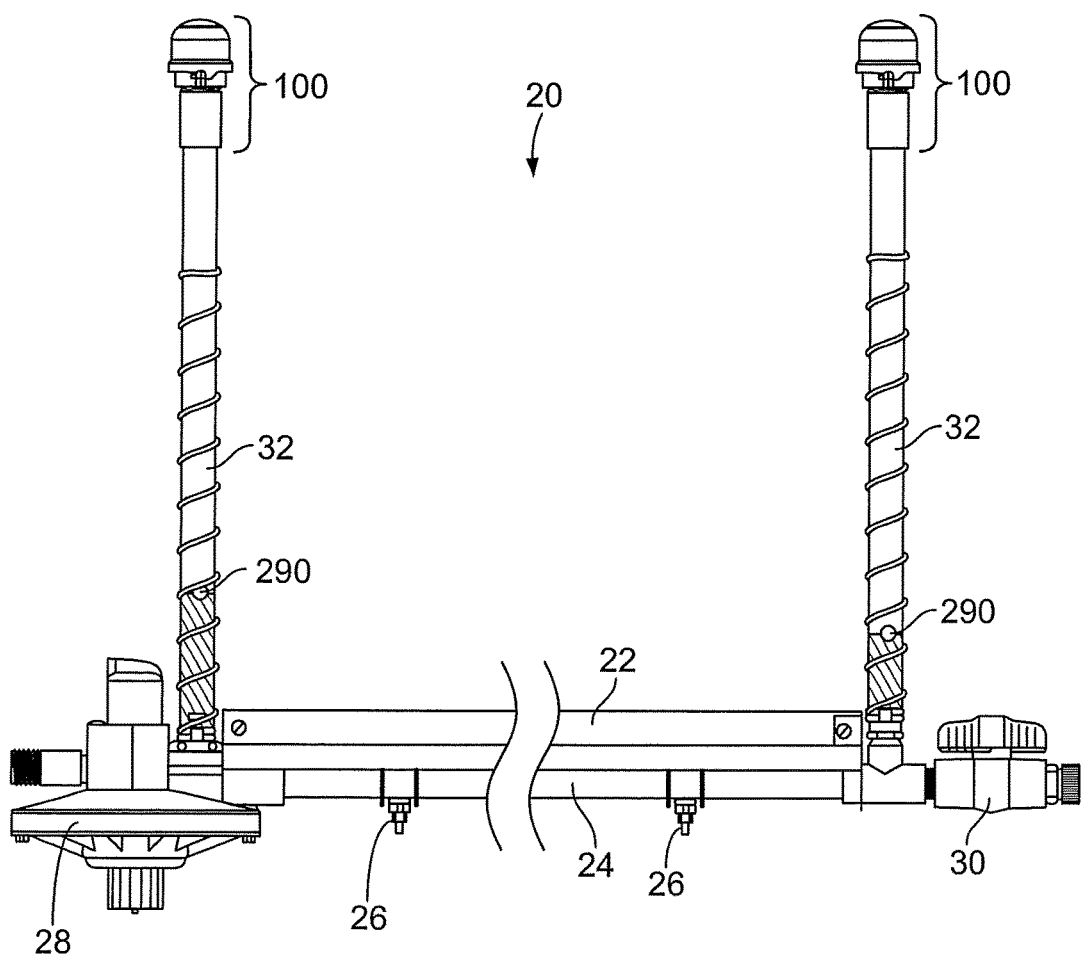
FIG. 1 is a side plan view of a nipple drinker watering assembly including the breather cap assembly of the invention.
Figures 2, 3:
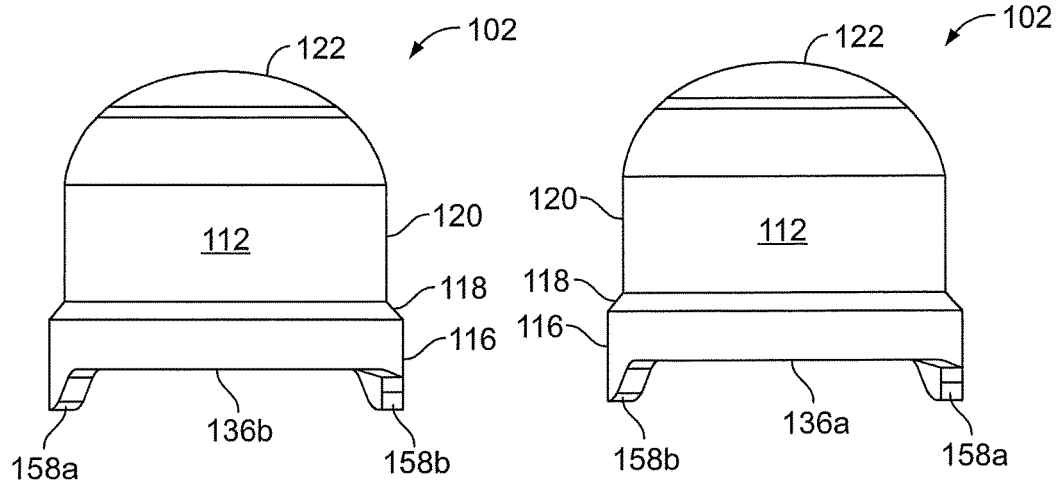
FIG. 2 is a right side view of a cap of the breather cap assembly of the invention.
FIG. 3 is a left side view of the cap of the breather cap assembly of the invention.
Figures 4, 5:
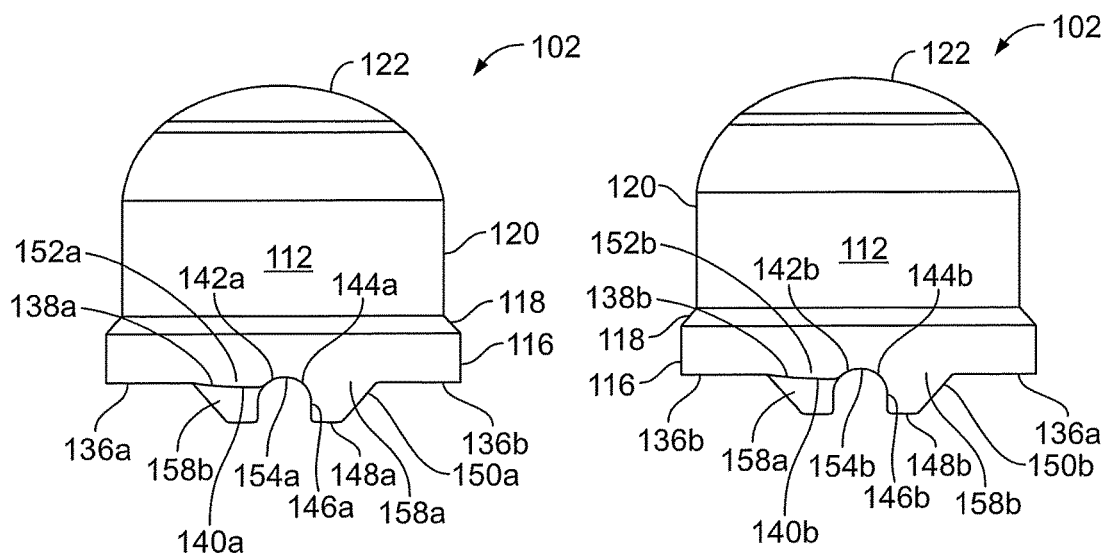
FIG. 4 is a front view of the cap of the breather cap assembly of the invention.
FIG. 5 is a rear view of the cap of the breather cap assembly of the invention.
Figure 10:
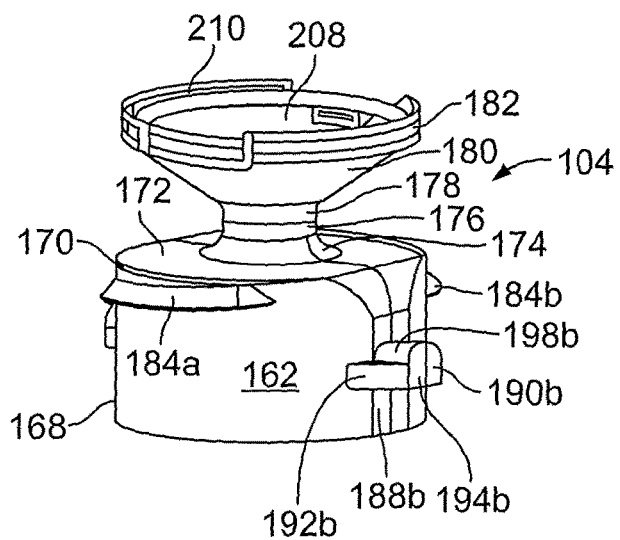
FIG. 10 is a perspective view of a body of the breather cap assembly of the invention.
Figure 24:
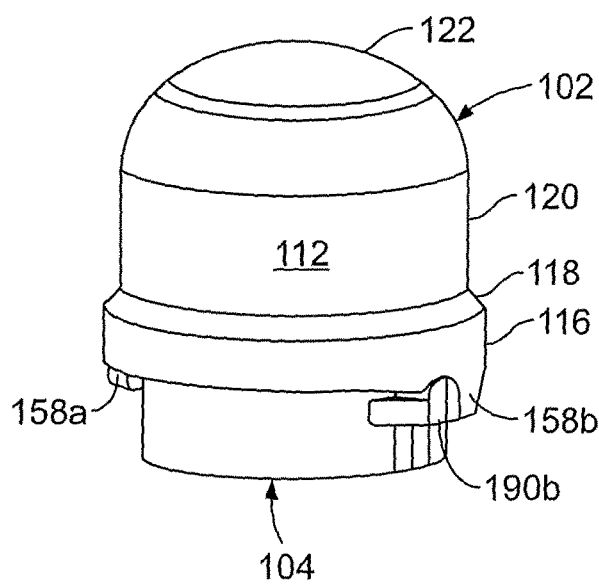
FIG. 24 is a perspective view of the breather cap assembly of the invention.
Figure 25:
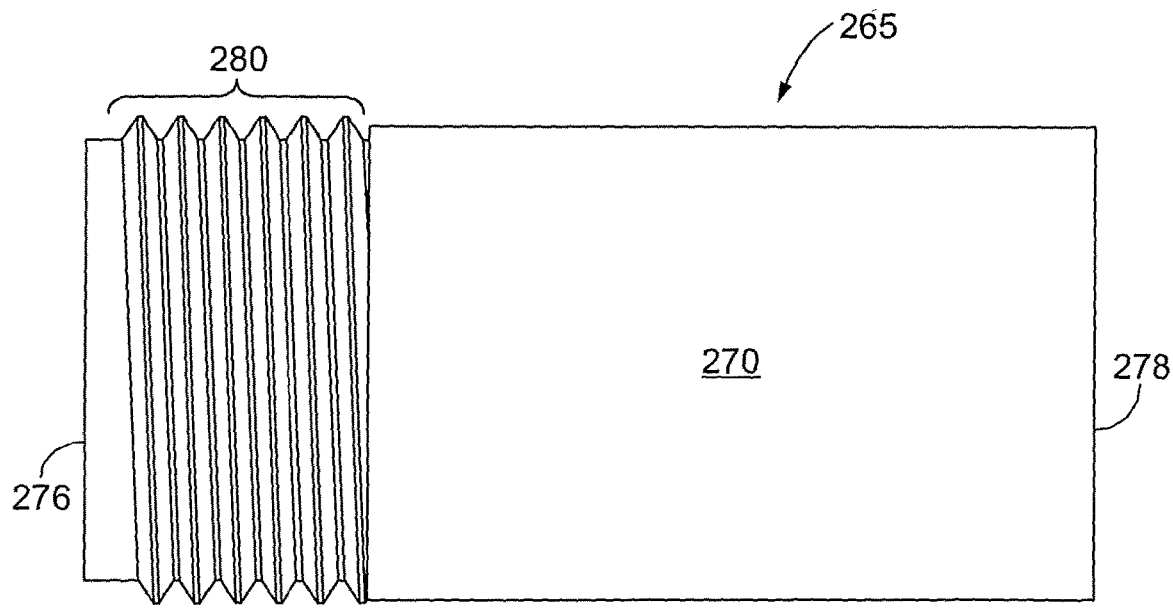
FIG. 25 is a side view of a connector of the breather cap assembly of the invention.
Figure 11:
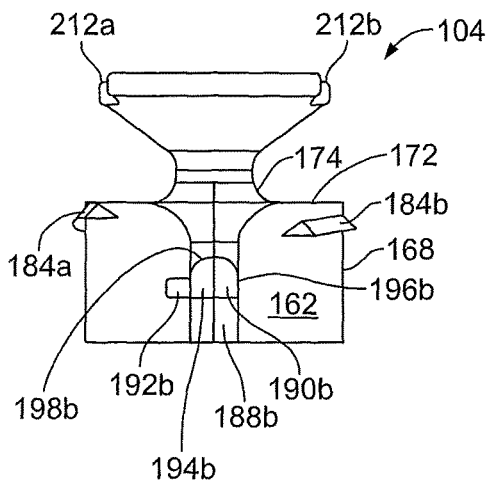
FIG. 11 is a rear view of the body of the breather cap assembly of the invention.
Figure 12:
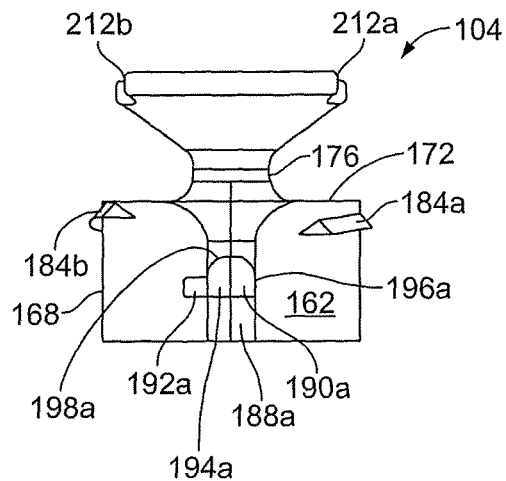
FIG. 12 is front view of the body of the breather cap assembly of the invention.
Figure 13:
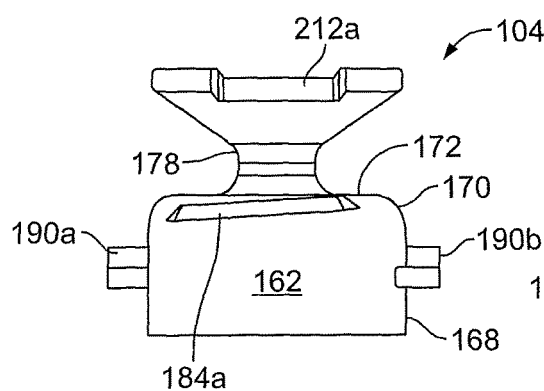
FIG. 13 is right side view of the body of the breather cap assembly of the invention.
Figure 14:
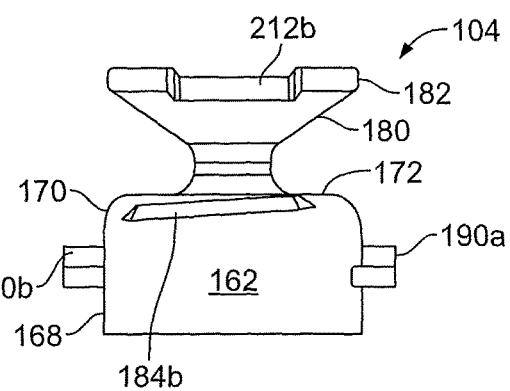
FIG. 14 is a left side view of the body of the breather cap assembly of the invention.
Figure 15:
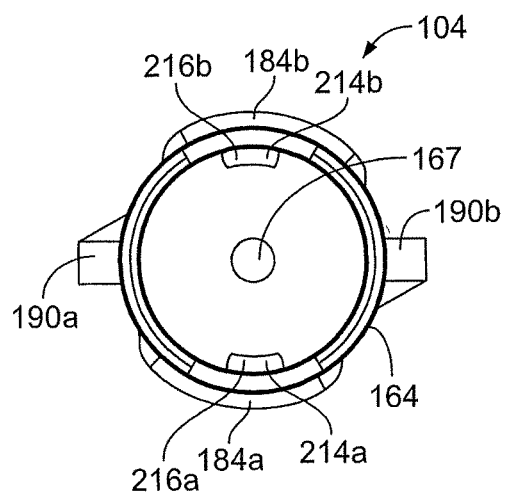
FIG. 15 is a top view of the body of the breather cap assembly of the invention.
Figure 16:
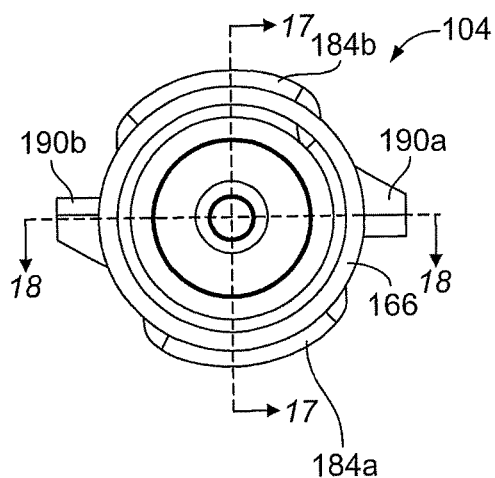
FIG. 16 is a bottom view of the body of the breather cap assembly of the invention.
Figure 17:
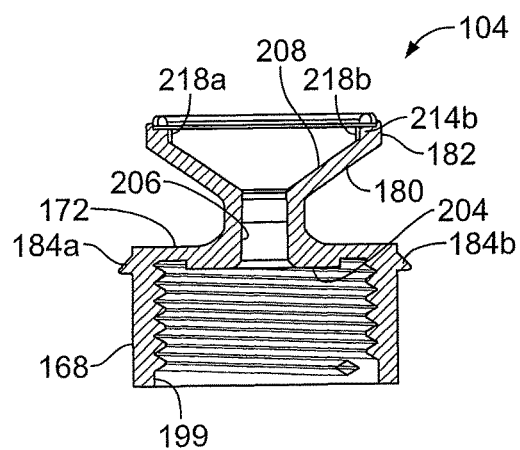
FIG. 17 is a cross-sectional view of the body taken along line 17-17 of FIG. 16.
Figure 18:
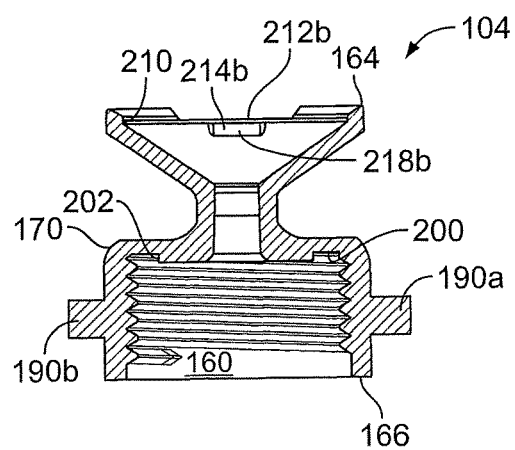
FIG. 18 is a cross-sectional view of the body taken along line 18-18 of FIG. 16.
Figure 26:
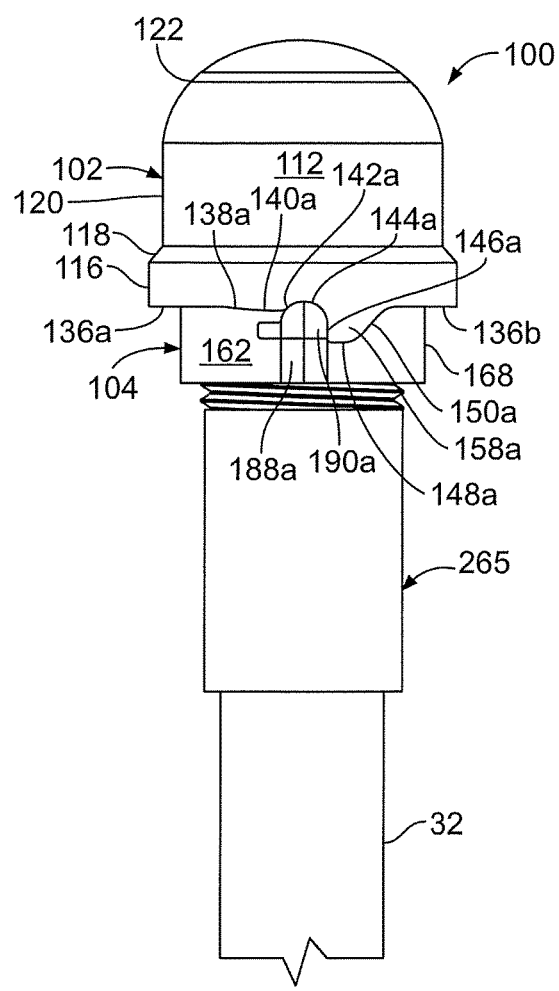
FIG. 26 is a front plan view of the breather cap assembly of the invention that is connected to a stand-tube.
Figure 27:
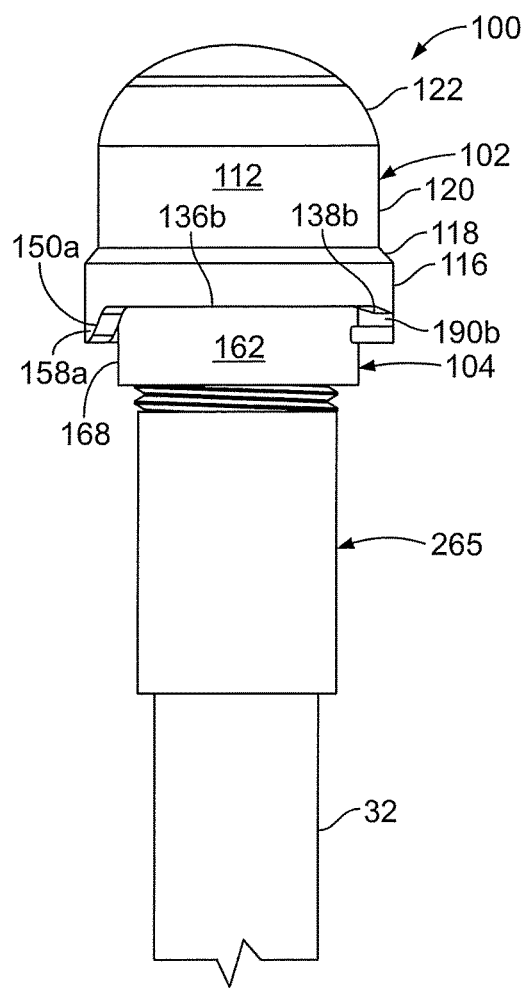
FIG. 27 is a side plan view of the breather cap assembly of the invention that is connected to a stand tube.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

FIG. 1 illustrates a breather cap assembly 100 of the preferred embodiment as it is used in connection with a conventional nipple drinker watering system 20. Other than the breather cap assembly 100, the nipple drinker watering system 20 typically includes a support member 22, a water supply line 24, nipple drinkers 26, a pressure regulator 28 at the inlet side of the water supply line 24, an automatic flush valve 30 at the outlet side of the water supply line 24, and stand-tubes 32. Each of the elements identified as being a part of the nipple drinker watering system 20, other than the breather cap assembly 100, are known in the art. Nipple drinker watering systems are used in floor or cage poultry raising systems, with FIG. 1 illustrating the breather cap assembly 100 being used in connection with a floor poultry raising system. It is to be understood that the present invention could equally be applicable to cage poultry raising systems, although the support member 22 would not likely be used in such a system.

Nipple drinker watering systems 20 typically have a plurality of stand-tubes 32 provided along their length, with the stand-tubes 32 typically being provided at every pressure regulator 28 and at the end of the water supply line 24. The stand-tubes 32 are preferably formed of a transparent material and are provided in the nipple drinker watering system 20 (typically with a float) in order to indicate visually the level of water pressure at that point in the water supply line 24.

A preferred embodiment of a breather cap assembly 100 is illustrated in FIGS. 1, 24 and 26-29. The preferred embodiment of the breather cap assembly 100 includes a cap 102, a body 104, and a seal 106.

A preferred embodiment of the cap 102 is described and illustrated with reference to FIGS. 2-9. The cap 102 has inner and outer surfaces 110, 112 which are connected to one another by a bottom surface 114. Extending upwardly from the bottom surface 114, the outer surface 112 of the cap 102 has a first cylindrical portion 116, a truncated conical portion 118, a second cylindrical portion 120, and a generally domed portion 122. The first cylindrical portion 116 of the outer surface 112 has a larger diameter than the second cylindrical portion 120 of the outer surface 112.

Extending upwardly from the bottom surface 114, the inner surface 110 of the cap 102 has a first cylindrical portion 124, a truncated conical portion 126, a second cylindrical portion 128, and a generally domed portion 130. The first cylindrical portion 124 of the inner surface 110 has a larger diameter than the second cylindrical portion 128 of the inner surface 110. The diameter of the first cylindrical portion 124 of the inner surface 110 is approximately equivalent to the diameter of the second cylindrical portion 120 of the outer surface 112.

A circumferential flange 131 extends downwardly from the generally domed portion 130 of the inner surface 110. An end 132 of the circumferential flange 131 extends downwardly to a position which is generally planar with the connection of the second cylindrical portion 128 and the generally domed portion 130 of the inner surface 110.

A pair of helical threads 134a, 134b extend inwardly from one or both of the first cylindrical portion 124 and the truncated conical portion 126 of the inner surface 110. The helical threads 134a, 134b are provided opposite one another and each helical thread 134a, 134b preferably extends approximately 90 degrees about the inner surface 110 of the cap 102. Each thread 134a, 134b preferably has a pitch of 0.3 and extends inwardly to a position which is generally planar with the second cylindrical portion 128 of the inner surface 110 of the cap 102.

The bottom surface 114 of the cap 102 is preferably provided with the following configuration as it moves about the bottom of the cap 102 in a circumferential manner. The bottom surface 114 is provided with a first portion 136a which extends in a horizontal manner to a second portion 138a. The second portion 138a is angled downwardly and extends to a third portion 140a. The third portion 140a extends in a horizontal manner to a fourth portion 142a. The fourth portion 142a curves upwardly in a convex manner to a fifth portion 144a. The fifth portion 144a curves first upwardly and then downwardly in a concave manner to a sixth portion 146a. The sixth portion 146a extends straight downwardly in a vertical manner to a seventh portion 148a. The seventh portion 148a extends in a horizontal manner to an eighth portion 150a. The eighth portion 150a is angled upwardly and extends to a first portion 136b. The first portion 136b extends in a horizontal manner to a second portion 138b. The second portion 138b is angled downwardly and extends to a third portion 140b. The third portion 140b extends in a horizontal manner to a fourth portion 142b. The fourth portion 142b curves upwardly in a convex manner to a fifth portion 144b. The fifth portion 144b curves first upwardly and then downwardly in a concave manner to a sixth portion 146b. The sixth portion 146b extends straight downwardly in a vertical manner to a seventh portion 148b. The seventh portion 148b extends in a horizontal manner to an eighth portion 150b. The eight portion 150b is angled upwardly and extends to the first portion 136a The second portions 138a, 138b are preferably angled downwardly relative to horizontal at an angle of approximately 8.2 degrees. The portion of the fifth portions 144a, 144b where the curve changes from curving upwardly to downwardly is preferably provided at a position which is higher than (when viewed in FIGS. 4 and 5) the first portions 136a, 136b of the bottom surface 114, for reasons which will be discussed in further detail hereinbelow. Thus, due to the configuration of the bottom surface 114 at the second, third, fourth and fifth portions 138a, 138b; 140a, 140b; 142a, 142b; 144a, 144b, two ramp portions 152a, 152b of the cap 102 are formed. Thus, due to the configuration of the bottom surface 114 at the fifth portions 144a, 144b, two pockets 154a, 154b of the cap 102 are formed between the fourth, fifth and sixth portions 142a, 142b; 144a, 144b; 146a, 146b. The connection of the sixth portions 146a, 146b to the seventh portions 148a, 148b are preferably below the first portions 136a, 136b, as well as below the third portions 140a, 140b, for reasons which will be discussed in further detail hereinbelow. Thus, due to the configuration of the bottom surface 114 at the sixth, seventh and eighth portions 146a, 146b; 148a, 148b; 150a, 150b, two extension portions 158a, 158b of the cap 102 are formed.

A preferred embodiment of the body 104 is described and illustrated with reference to FIGS. 10-18. The body 104 has inner and outer surfaces 160, 162 which are connected to one another by top and bottom surfaces 164, 166. An aperture 167 is provided through the body 104 and is defined by the inner surface 160. The top surface 164 is preferably rounded and the bottom surface 166 is preferably flat. Extending upwardly from the bottom surface 166, the outer surface 162 of the body 104 has a first cylindrical portion 168, a first truncated curved portion 170 which curves inwardly in a convex manner from the first cylindrical portion 168, a shoulder 172 which extends horizontally inwardly from the first truncated curved portion 170, a second truncated curved portion 174 which curves inwardly in a concave manner from the shoulder 172, a second cylindrical portion 176, a third truncated curved portion 178 which curves outwardly in a convex manner from the second cylindrical portion 176, a truncated conical portion 180, and a third cylindrical portion 182. The first cylindrical portion 168 of the outer surface 162 has a larger diameter than the third cylindrical portion 182 of the outer surface 168 which, in turn, has a larger diameter than the second cylindrical portion 176 of the outer surface 162.

A pair of helical threads 184a, 184b extend outwardly from one or both of the first cylindrical portion 168 and the first truncated curved portion 170 of the outer surface 162. The helical threads 184a, 184b are provided opposite one another and each helical thread 184a, 184b preferably extends approximately 72 degrees about the inner surface 162 of the body 104. Each thread 184a, 184b preferably has a pitch of 0.3.

The first cylindrical portion 168 and the first truncated curved portion 170 preferably do not run continuously, but are broken up by two flat surfaces 188a, 188b which are provided on the outer surface 162 and which extend from the bottom surface 166 to the shoulder 172. The two flat surfaces 188a, 188b are preferably provided opposite one another and are provided between the helical threads 184a, 184b.

First and second flanges 190a, 190b extend outwardly from the outer surface 162 of the body 104. First portions 192a, 192b of the flanges 190a, 190b extend straight outwardly from the flat surfaces 188a, 188b, respectively. Second portions 194a, 194b of the flanges 190a, 190b extend angularly outwardly from the first cylindrical portion 168. The second portions 194a, 194b are configured to provide strength to the first portions 192a, 192b and the first and second portions 192a, 192b; 194a, 194b have lower surfaces which are preferably planar with one another. The first portions 192a, 192b of the flanges 190a, 190b have flat leading surfaces 196a, 196b (provided opposite the second portions 194a, 194b) and rounded or domed upper surfaces 198a, 198b.

Extending upwardly from the bottom surface 166, the inner surface 160 of the body 104 has a first cylindrical portion 199 which is preferably threaded, a first shoulder 200 which extends horizontally inwardly from the first cylindrical portion 199, a second cylindrical portion 202 which extends downwardly from the shoulder 200, a second shoulder 204 which extends horizontally inwardly from the second cylindrical portion 202, a first truncated conical portion 206 which preferably tapers at an angle of 5 degrees relative to vertical, a second truncated conical portion 208 which preferably angles outwardly at an angle of 55 degrees to vertical, and a third cylindrical portion 210 which connects to the rounded top surface 164 of the body 104. The connection between the third cylindrical portion 210 and the rounded top surface 164 may be made by a truncated conical portion. The connection between the second shoulder 204 and the first truncated conical portion 206 may be made by a truncated curved portion. The connection between the first truncated conical portion 206 and the second truncated conical portion 208 may be made by a truncated curved portion. The third cylindrical portion 210 preferably has a diameter which is larger than a diameter of the first cylindrical portion 199 which, in turn, has a diameter which is larger than a diameter of the second cylindrical portion 202.

The body 104 provides for a pair of notches 212a, 212b to be provided at the top end thereof. The notches 212a, 212b are formed in a manner by the top surface 164, the third cylindrical portion 182 of the outer surface 162, and the third cylindrical portion 210 of the inner surface 160 all not running continuously, but by being formed in two parts, each of which preferably extends for 120 degrees and positioned opposite one another, such that each notch 212*a*, 212*b* preferably extends for 60 degrees about the circumference of the body 104 at the top thereof. The notches 212*a*, 212*b* may also extend into the truncated conical portion 180 defined by the outer surface 162 and into the second truncated conical portion 208 defined by the inner surface 160, if desired.

A pair of ledges 214*a*, 214*b* preferably extend inwardly from the second truncated conical portion 208 defined by the inner surface 160 of the body 104. The ledges 214*a*, 214*b* each have a generally horizontal surface 216*a*, 216*b* which extends inwardly from the second truncated conical portion 208 and a generally vertical surface 218*a*, 218*b* which extends downwardly from the generally horizontal surface 216*a*, 216*b* to the second truncated conical portion 208. The ledges 214*a*, 214*b* are preferably positioned in alignment with the notches 212*a*, 212*b*.

A preferred embodiment of the seal 106 is described and illustrated with reference to FIGS. 19-23. The seal 106 is preferably formed of an elastomeric material, such as rubber. The seal 106 has inner and outer surfaces 220, 222 which are connected to one another by top and bottom surfaces 224, 226. An aperture 227 is formed through the seal 106 and is defined by the inner surface 220. The top and bottom surfaces 224, 226 are preferably flat. Extending upwardly from the bottom surface 226, the outer surface 222 of the seal 106 has a first cylindrical portion 228, a shoulder 230 which extends horizontally outwardly from the first cylindrical portion 228, and a second cylindrical portion 232 which extends to the top surface 224. The second cylindrical portion 232 has a larger diameter than the first cylindrical portion 228.

Extending upwardly from the bottom surface 226, the inner surface 220 of the seal 106 has a truncated conical portion 234, a first truncated curved portion 236 which curves inwardly in a convex manner from the truncated conical portion 234, a second truncated curved portion 238 which curves inwardly in a concave manner from the first truncated curved portion 236, a first cylindrical portion 240, a shoulder 242 which extends horizontally outwardly from the first cylindrical portion 240, and a second cylindrical portion 244 which extends to the top surface 224. The second cylindrical portion 244 has a larger diameter than the first cylindrical portion 240. The second cylindrical portion 244 preferably has a larger diameter than the first cylindrical portion 228 defined by the outer surface 222 of the seal 106.

The seal 106 also preferably has one or more flanges 246 which extend outwardly from the second cylindrical portion 232 of the outer surface 222. The flanges 246 are preferably rounded along their outer edge and a top surface 248 of the flanges 246 are preferably planar with the top surface 224 of the seal 106, which a lower surface of the flanges 246 are preferably distanced from the shoulder 230 of the outer surface 222. The seal 106 preferably has three flanges 246 which are equidistantly spaced apart from one another about the circumference of the seal 106.

Figure 28:
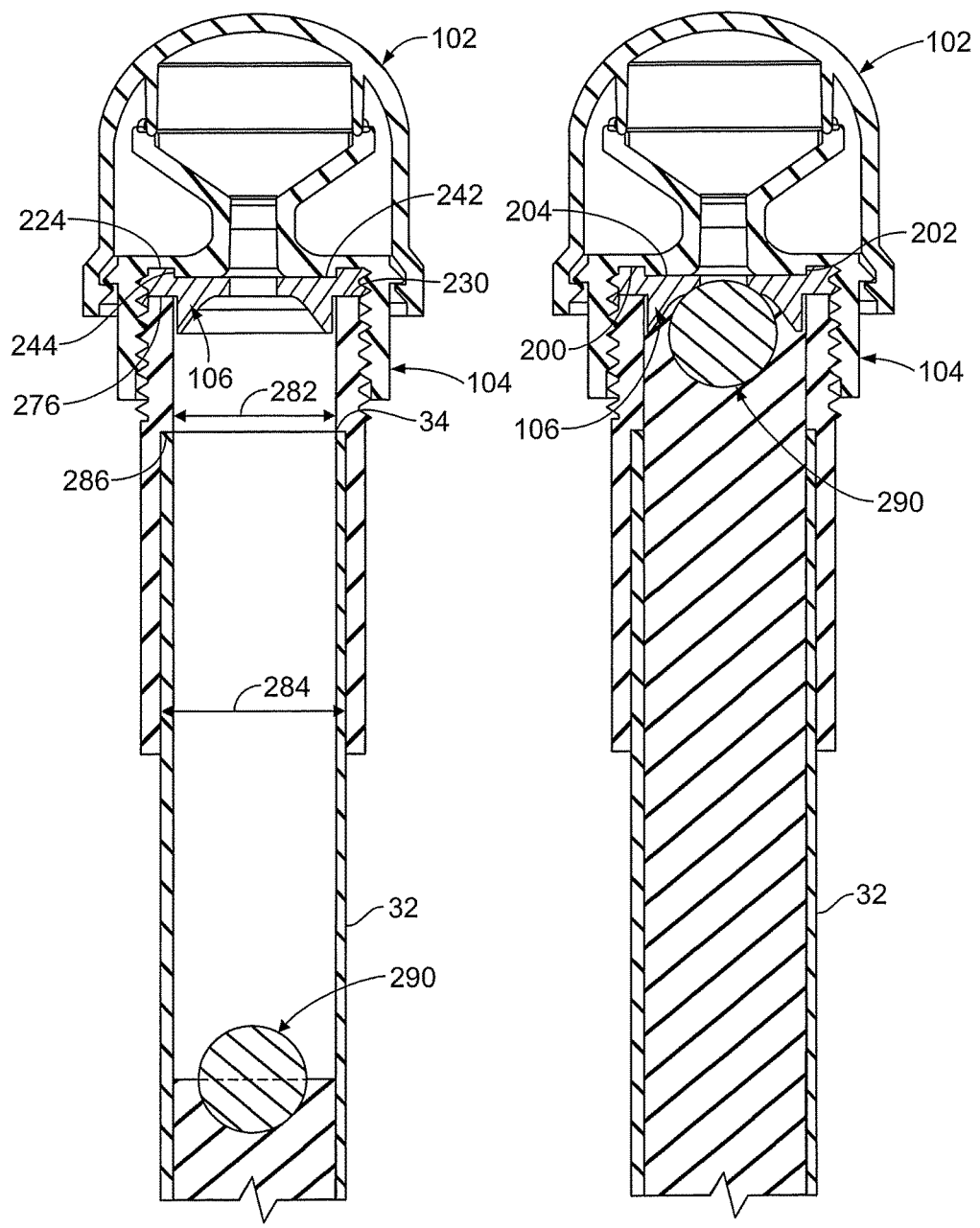
FIG. 28 is a cross-sectional view of the breather cap assembly of the invention that is connected to a stand tube with the nipple drinker watering system being in a normal operating mode.

In order to form the breather cap assembly 100, the seal 106 is forced into the aperture 167 of a lower portion (generally defined by the first cylindrical portion 168, the first truncated curved portion 170 and the shoulder 172) of the body 104 from the bottom thereof until the top surface 224 of the seal 106 faces, and preferably abuts against, the first shoulder 200 of the inner surface 160 of the body 104, as best illustrated in FIG. 28. In this position, the second cylindrical portion 244 of the inner surface 220 of the seal 106 faces, and preferably abuts against, the second cylindrical portion 202 of the inner surface 160 of the body 104, and the shoulder 242 of the inner surface 220 of the seal 106 faces, and preferably abuts against, the second shoulder 204 of the inner surface 160 of the body 104. The flanges 246 extend into the threads formed on the first cylindrical portion 199 of the inner surface 160 of the body 104 and assist in holding the seal 106 in place relative to the body 104 via threading and/or a friction fit. With the seal 106 in position inside the body 104, the portion of the aperture 227 of the seal 106 which is defined by the first cylindrical portion 240 of the inner surface 220 is in general alignment with, and in fluid communication with, the portion of the aperture 167 of the body 104 which is defined by the first truncated conical portion 206 of the inner surface 160 of the body 104.

The body 104 is then inserted into the cap 102 and locked into position. The top surface 164 of the body 104 enters the cap 102 between the bottom surface 114 thereof with the flanges 190*a*, 190*b* of the body 104 preferably being positioned below the horizontal first portions 136*a*, 136*b* of the bottom surface 114 of the cap 102, preferably more proximate to the extension portions 158*b*, 158*a* than to the ramp portions 152*a*, 152*b*. Insertion of the body 104 into the cap 102 stops when the helical threads 184*a*, 184*b* of the body 104 come into contact with the helical threads 134*a*, 134*b* of the cap 102, respectively. In this position, the rounded or domed upper surfaces 198*a*, 198*b* of the first portions 192*a*, 192*b* of the flanges 190*a*, 190*b* of the body 104 are preferably positioned against or slightly separated from the horizontal first portions 136*a*, 136*b* of the bottom surface 114 of the cap 102. If the body 104 is not initially inserted in the cap 102 in the preferred manner, the body 104 can be rotated relative to the cap 102 (or the cap 102 can be rotated relative to the body 104—or both can be rotated relative to one another) in order to bring the body 104 into the appropriate position relative to the cap 102.

With the body 104 in the appropriate position relative to the cap 102, the body 104 is preferably rotated clockwise relative to the cap 102 (or the cap 102 is rotated counter-clockwise relative to the body 104—or they are both rotated relative to one another) so that the helical thread 184*a* of the body 104 is threaded over the helical thread 134*b* of the cap 102, and so that the helical thread 184*b* of the body 104 is threaded over the helical thread 134*a* of the cap 102, thereby preventing the body 104 from being pulled out of the cap 102.

As the helical threads 184*a*, 184*b* are being threaded over the helical threads 134*b*, 134*a*, respectively, the rounded or domed upper surfaces 198*a*, 198*b* of the flanges 190*a*, 190*b* are moved along, and preferably slightly engage, the horizontal first portions 136*a*, 136*b* of the bottom surface 114 of the cap 102, and then along the ramp portions 152*a*, 152*b* of the bottom surface 114 of the cap 102, and into the pockets 154*a*, 154*b*. With the rounded or domed upper surfaces 198*a*, 198*b* of the flanges 190*a*, 190*b* being positioned in the pockets 154*a*, 154*b*, the flanges 190*a*, 190*b* are prevented from further clockwise movement as the flat leading surfaces 196*a*, 196*b* of the flanges 190*a*, 190*b* will abut against the extension portions 158*a*, 158*b* of the cap 102. Further, the flanges 190*a*, 190*b* are prevented from counter-clockwise movement in view of the provision of the ramp portions 152*a*, 152*b*. Downward movement of the body 104 relative to the cap 102 is prevented due to the threading of the helical threads 184*a*, 184*b* over the helical threads 134*b*, 134*a*, respectively, and upward movement of the body 104 relative to the cap 102 is prevented due to the horizontal surfaces 216*a*, 216*b* of the ledges 214*a*, 214*b* of the body 104 coming into contact with the end 132 of the circumferential flange 131 of the cap 102. Thus, the body 104 is essentially locked into place relative to the cap 102.

Figure 29:
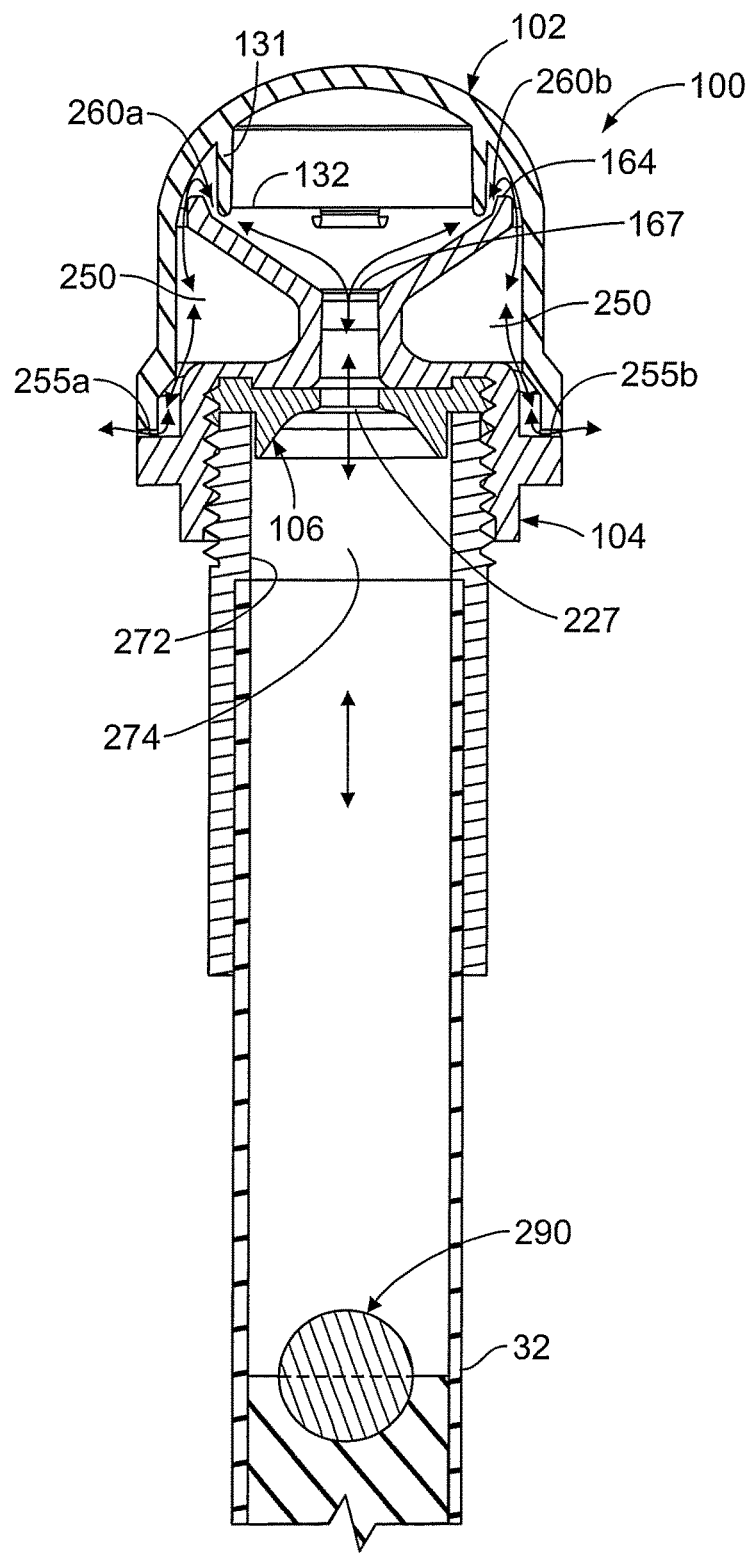
FIG. 29 is identical to FIG. 28, but has been rotated ninety degrees relative to FIG. 28.

With the body 104 locked into place relative to the cap 102, a gap 250 is formed between the inner surface 110 of the cap 102 and the outer surface 162 of the body 104, as best illustrated in FIG. 29. The gap 250 is in communication with the outside environment by a pair of passageways 255a, 255b which are provided between the helical threads 184a, 184b and the helical threads 134b, 134a. The gap 250 is further in communication with the aperture 167 of the body 104 by a pair of passageways 260a, 260b which are formed, preferably circumferentially, between the ledges 214a, 214b. The passageways 260a, 260b are further formed between the circumferential flange 131 of the cap 102 and the third cylindrical portion 210 and the second truncated conical portion 208 of the inner surface 160 of the body 104 since the end 132 of the circumferential flange 131 extends below the top surface 164 of the body 104.

With the body 104 locked into place relative to the cap 102, a connector 265 is preferably utilized to connect the body 104 to a stand-tube 32 of the nipple drinker watering system 20. The connector 265 may be considered to be a part of the breather cap assembly 100. The connector 265 is preferably an elongated tube-like member which has an outer surface 270 and an inner surface 272 which is defined by an aperture 274 that extends through the connector 265 from a first end 276 thereof to a second end 278 thereof. The outer surface 270 of the connector 265 proximate to the first end 276 is preferably threaded to provide a threaded portion 280 of the connector 265. The inner surface 272 of the connector 265 preferably defines a first diameter portion 282 proximate to the first end 276 and a second diameter portion 284 proximate to the second end 278. The first and second diameter portions 282, 284 are separated by a shoulder 286 and the second diameter portion 284 preferably has a larger diameter than the first diameter portion 282.

The threaded portion 280 of the connector 265 is threadedly engaged with the threaded first cylindrical portion 199 of the body 104 in order to connect the connector 265 to the body 104. Threading of the connector 265 the body 104 preferably continues until the first end 276 of the connector 265 abuts against, and preferably exerts a force against, the shoulder 230 of the seal 106, such that the seal 106 is further held in position within the aperture 167 of the body 104. A top end 34 of the stand-tube 32 is then inserted into the aperture 274 of the connector 265 from the second end 278 thereof, preferably until the top end 34 is positioned against the shoulder 286 of the connector 265. The connector 265 and the stand-tube 32 are preferably secured to one another using known means, such as adhesives.

Prior to the connector 265 being secured to the stand-tube 32, a valve 290 is inserted into the stand-tube 32. The valve 290 may be considered to be a part of the breather cap assembly 100. The valve 290 is preferably a ball valve which is formed of a material that floats in water.

When the watering system 20 is operating in a normal mode, the valve 290 floats on the water within the stand-tube 32. The position of the valve 290 within the stand-tube provides for an easy visual indication of the water pressure (via water column) within the watering system 20 at the position where the stand-tube 32 is provided. Air is also allowed to vent out of the stand-tube 32, as illustrated in FIG. 29 by the arrows, by moving through the aperture 274 of the connector 265, if provided, through the aperture 227 of the seal 106, through the aperture 167 of the body 104, through the passageways 260a, 260b, through the gap 250, and through the passageways 255a, 255b to the exterior of the breather cap assembly 100. Air can also flow back into the stand-tube 32 via the same route. The configuration of the breather cap assembly 100 also acts as a baffle to minimize the possibility of any foreign material from outside the breather cap assembly 100 entering the stand-tube 32 and, thus, the water within the watering system 20. More specifically, any foreign material would need to move upward through the passageways 255a, 255b, continue upward through the gap 250, and then move downward through the passageways 260a, 260b in order to have the opportunity to be introduced into the stand-tube 32. The extra provision of the end 132 of the circumferential flange 131 extending below the top surface 164 of the body 104, thereby defining the passageways 260a, 260b between the ledges 214a, 214b further aids in preventing foreign material from entering the stand-tube 32.

When the watering system 20 is operating in a flush mode, the water pressure in the water supply line 24 is increased, which causes the valve 290 to move upwardly in the stand-tube 32. Because it is undesirable to have the valve 290 blow out of the stand-tube 32, and because it is further undesirable for water from within the stand-tube 32 to leak out of the system 20 via the stand-tube 20, the breather cap assembly 100 is provided.

With the breather cap assembly 100 in position, the water, and thus the valve 290, are forced upwardly toward the breather cap assembly 100. The valve 290 is forced into the aperture 227 of the seal 106 until it abuts and pushes against the second truncated curved portion 238 of the seal 106, as illustrated in FIG. 30. The configuration of the truncated conical portion 234 and the first truncated curved portion of the seal 104 aids the valve 290 in moving into position against the second truncated curved portion 238. By pushing against the second truncated curved portion 238, the valve 290 slightly deforms the first and second truncated curved portions 236, 238 such that the inner surface 220 of the seal 206 previously defined by the truncated conical portion 234 and the first and second truncated curved portions 236, 238 becomes generally pyramidal in configuration. By the valve 290 pushing against the second truncated curved portion 238, the valve 290 seals off the aperture 227 of the seal 106 and further forces the seal 106 to be pushed against the body 104. Because of the seal created by the valve 290, a large majority of the water from the stand-tube 32 is prevented from escaping the stand-tube 32.

Despite the valve 290 sealing off the aperture 227 of the seal 106, it is possible that some water from the stand-tube 32 will escape the stand-tube 32 before the seal is made, such that the water enters the aperture 167 of a top portion (which is generally defined by the second and third truncated curved portions 174, 178, the second and third cylindrical portions 176, 182, and the truncated conical portion 180) of the body 104. As it is undesirable for such water to exit the breather cap assembly 100, the breather cap assembly 100 is configured to minimize the possibility of any such water exiting the breather cap assembly 100.

More specifically, because the body 104 is generally V-shaped in configuration due to the second truncated conical portion 208 of the body 104, the top portion of the body 104 generally defines a large water collection area. The water collection area is designed to try and catch as much water as possible and to cause the water to fall back toward the valve 290. The circumferential flange 131 of the cap 102 is also configured to act as a splash guard in order to prevent water from moving out of the breather cap assembly 100 and to redirect any such water back to the water collection area defined by the body 104. Preferably, the substantially V-shaped water collection area defined by the second truncated conical portion 208 of the body 104 has a diameter substantially equal to the diameter of the inner surface 110 of the cap 102. More preferably, the substantially V-shaped water collection area defined by the second truncated conical portion 208 of the body 104 has a diameter slightly less than the diameter of the inner surface 110 of the cap 102.

Thus, because of the configuration of the breather cap assembly 100, it is highly improbable that any water from the stand-tube 32 will escape the breather cap assembly 100 via the passageways 260a, 260b, the gap 250, and the passageways 255a, 255b.

Once the flushing operation is completed, the watering system 20 returns to a normal mode of operation and, thus, the valve 290 unseals itself from the seal 106. When the valve 290 unseals, the water collected in the water collection area of the top portion of the body 104 is allowed to return to the stand-tube 32.

The breather cap assembly 100 thus provides a number of advantages over the prior art. The breather cap assembly 100 minimizes the potential for air lock by providing for ample breathing area which decreases the velocity of the exiting air, which in turn reduces the suction that would pull the valve 290 to a sealing position. Further, the valve 290 moves up and down the length of the stand-tube 32 based on the water column, which further reduces the chance that the valve 290 will move to a sealing position when not desired. The buoyancy of the valve 290 and the ductility of the seal 106 also dramatically decrease the amount of leaking by allowing a seal to be formed at low water pressures. The V-configuration of the top portion of the body 104 creates a water collection area for water that escapes before the seal is formed. The circumferential flange 131 of the cap 102 prevents water from splashing and redirects such water to the water collection area. The breather cap assembly 100 is also designed to be secured to the connector 265 (or the stand-tube 32 itself) as an assembly. While it is possible to secure the body 104 to the connector 265 before the cap 102 is secured to the body 104, it is preferable to first secure the cap 102 to the body 104 in order to reduce the chance that the top portion of the body 104 is sheared off if the body 104 were to be connected to the connector 265 without the cap 102. The mating geometries of the cap 102 and body 104 allow for torque transfer which removes the stress off of the locking feature. The geometry in the lower portion of the body 104 where the seal 106 sits is further designed to allow the valve 290 to wedge the seal 106 into a pyramid shape which creates a seal between the valve 290 and the seal 106 and between the seal 106 and the body 104. The cap 102 also creates a baffle for air flow both in and out of the assembly 100. The baffle reduces the ability of unwanted materials, such as air particles (e.g., dust) from entering the assembly 100 which is important in reducing contamination of the water and avoids the creation of blockages in the breather cap assembly 100.

While a preferred embodiment of the present invention is shown and described, it is envisioned that those skilled in the art may devise various modifications of the present invention without departing from the spirit and scope of the invention.

For instance, the connection of the body 104 to the stand-tube 32 could be changed, as it should be understood that it is possible to remove the connector 265 such that the body 104 of the breather cap assembly 100 could be directly connected to the stand-tube 32. The connector 265 could alternatively be connected to the outer surface 162 of the body 104 and the connector 265 could alternatively be connected to an inner surface of the stand-tube 32. Further, the manner in which the cap 102 is secured to the body 104 could be changed as desired, for example to a snap-lock feature. The configurations of the cap 102, the body 104 and the seal 106 could also be altered, so long as the changes made to the cap 102, the body 104 and the seal 106 do not substantially affect the ability of the breather cap assembly 100 to perform the desired functions.

What is claimed:

1. A breather cap assembly being selectively operable in either a normal mode or a flush mode, the breather cap assembly comprising:

a body having an upper portion, a lower portion, and an aperture which extends through the upper and lower portions of the body, and wherein the upper portion of the body is approximately V-shaped and concave in configuration so as to define a water collection area;

a seal having an aperture provided therethrough, the seal being positioned within a portion of the aperture which extends through the lower portion of the body such that the aperture of the seal is in fluid communication with a portion of the aperture which extends through the upper portion of the body;

a cap which surrounds the upper portion of the body and which is secured to the lower portion of the body, wherein the cap has a flange with a sidewall defining a perimeter, wherein the sidewall is closed throughout the perimeter, wherein the flange extends inwardly from the cap and engages a portion of the upper portion of the body;

a valve; and a connector, the connector having a first end portion which is configured to be secured to the lower portion of the body and a second end portion which is configured to be secured to a stand-tube used in a watering assembly having a water supply line in communication with said stand-tube;

wherein a position of the cap relative to the body defines a passageway between an outer surface of the body and an inner surface of the cap, and wherein the approximately V-shaped water collection area of said upper portion of said body has a diameter approximately equal to and slightly less than a diameter of said inner surface of said cap, and wherein the passageway comprises an opening at a lower end thereof, and wherein when said breather cap assembly is selectively operating in said normal mode, said valve is disengaged from said aperture of said seal and floats on water within said stand-tube such that the opening allows for air from outside of the breather cap assembly to enter the passageway, to flow upwardly through the passageway, between the cap and the body, into and downwardly through the portion of the aperture which extends through the upper portion of the body, and into and downwardly through the aperture of the seal, and vice-versa; wherein said breather cap assembly is selectively operable in said flush mode when water pressure in said water supply line is selectively increased; and wherein when the breather cap assembly is selectively operating in the flush mode, said increase in water pressure causes said valve to move upwardly in said stand-tube which seals the aperture of the seal, thereby preventing air flow from the portion of the aperture which extends through the upper portion of the body into the aperture of the seal, and vice-versa, and the passageway remains open such that air can enter the passageway and flow into and downwardly through the approximately v-shaped water collection area.

2. The breather cap assembly as defined in claim 1, wherein when the valve seals the aperture of the seal, the valve wedges the seal into an approximately pyramidal shape to create a seal between the valve and the seal and between the seal and the body.

3. The breather cap assembly as defined in claim 1, wherein an interior surface of the lower portion of the body is threaded, wherein an exterior surface of the first end portion of the connector is threaded, and wherein the interior surface of the lower portion of the body and the exterior surface of the first end portion of the connector are threadedly engaged to one another.

4. The breather cap assembly as defined in claim 1, wherein the flange extends inwardly from the cap toward the upper portion of the body, the flange being provided to minimize a possibility of material from outside the breather cap assembly entering the apertures of the body and the seal.

5. The breather cap assembly as defined in claim 1, wherein the cap and the body are releasably secured to one another.

6. The breather cap assembly as defined in claim 5, wherein the body has at least one helical thread and at least one flange extending outwardly from the lower portion thereof, and wherein the cap has at least one helical thread extending inwardly therefrom and at least one extension portion extending downwardly therefrom, the at least one helical thread of the cap being configured to move along and over the at least one helical thread of the body until the at least one flange of the body is stopped from further movement by the at least one extension portion of the cap.

7. A watering system comprising:
a hollow stand-tube having a free end, the hollow stand-tube being in communication with a water supply line, said stand-tube configured to hold water therein; and
a breather cap assembly associated with the hollow-stand tube, the breather cap assembly being selectively operable in either a normal mode or a flush mode, the breather cap assembly comprising:
a body having an upper portion, a lower portion, and an aperture which extends through the upper and lower portions of the body, and wherein the upper portion of the body is approximately V-shaped and concave in configuration so as to define a water collection area;
a seal having an aperture provided therethrough, the seal being positioned within a portion of the aperture which extends through the lower portion of the body such that the aperture of the seal is in fluid communication with a portion of the aperture which extends through the upper portion of the body;
a cap which surrounds the upper portion of the body and which is secured to the lower portion of the body, wherein the cap has a flange with a sidewall defining a perimeter, wherein the sidewall is closed throughout the perimeter, wherein the flange extends inwardly from the cap and engages a portion of the upper portion of the body;
a valve which is positioned within the hollow stand-tube and which is configured to float in the water within the hollow stand-tube in order to provide a visual indication of a height of the water in the hollow stand-tube, the valve further being configured to seal the aperture of the seal in order to minimize the possibility of water escaping out of the hollow stand-tube when the height of the water within the hollow stand-tube rises, thereby further preventing air flow between an outside of the breather cap assembly and the hollow stand-tube; and
a connector, the connector having a first end portion which is configured to be secured to the lower portion of the body and a second end portion which is configured to be secured to the free end of said stand-tube;
wherein a position of the cap relative to the body defines a passageway between an outer surface of the body and an inner surface of the cap, and wherein the approximately V-shaped water collection area of said upper portion of said body has a diameter approximately equal to and slightly less than a diameter of said inner surface of said cap, and wherein the passageway comprises an opening at a lower end thereof, and wherein when said breather cap assembly is selectively operating in said normal mode, said valve is disengaged from said aperture of said seal and floats on water within said stand-tube such that the opening allows for air from outside of the breather cap assembly to enter the passageway, to flow upwardly through the passageway, between the cap and the body, into and downwardly through the portion of the aperture which extends through the upper portion of the body, and into and downwardly through the aperture of the seal, and vice-versa; wherein said breather cap assembly is selectively operable in said flush mode when water pressure in said water supply line is selectively increased; and wherein when said breather cap assembly is selectively operating in said flush mode, said increase in water pressure causes said valve to move upwardly in said stand-tube which seals the aperture of the seal, thereby preventing air flow from the portion of the aperture which extends through the upper portion of the body into the aperture of the seal, and vice-versa, and the passageway remains open such that air can enter the passageway and flow into and downwardly through the approximately v-shaped water collection area.

8. The watering system as defined in claim 7, wherein when the valve seals the aperture of the seal, the valve wedges the seal into an approximately pyramidal shape to create a seal between the valve and the seal and between the seal and the body.

9. The watering system as defined in claim 8, wherein an interior surface of the lower portion of the body is threaded, wherein an exterior surface of the first end portion of the connector is threaded, and wherein the interior surface of the lower portion of the body and the exterior surface of the first end portion of the connector are threadedly engaged to one another.

10. The watering system as defined in claim 9, wherein the upper portion of the body is approximately V-shaped in configuration in order to collect any water that may have escaped through the aperture of the seal prior to the valve sealing off the aperture when the height of the water within the hollow stand-tube rises.

11. The watering system as defined in claim 10, wherein the flange extends inwardly from the cap toward the upper portion of the body, the flange being provided to minimize water from exiting the breather cap assembly that may have escaped through the aperture of the seal prior to the valve sealing off the aperture when the height of the water within the hollow stand-tube rises, to redirect such water to the upper portion of the body, and to minimize the possibility of material from outside the breather cap assembly entering the hollow stand-tube.

12. The watering system as defined in claim 7, wherein the flange extends inwardly from the cap toward the upper portion of the body, the flange being provided to minimize the possibility of material from outside the breather cap assembly entering the hollow stand-tube.

13. The watering system as defined in claim 7, wherein the cap and the body are releasably secured to one another.

14. The watering system as defined in claim 13, wherein the body has at least one helical thread and at least one flange extending outwardly from the lower portion thereof, and wherein the cap has at least one helical thread extending inwardly therefrom and at least one extension portion extending downwardly therefrom, the at least one helical thread of the cap being configured to move along and over the at least one helical thread of the body until the at least one flange of the body is stopped from further movement by the at least one extension portion of the cap.

15. The watering system as defined in claim 7, further comprising a pressure regulator, and a plurality of nipple drinkers, the water supply line configured to receive water from a source, the pressure regulator being configured to regulate a pressure of the water within the water supply line, the plurality of nipple drinkers being operatively associated with the water supply line in order to provide water for drinking therefrom, the hollow stand-tube being operatively associated with the water supply line in order to provide a visual indication of the water pressure in the water supply line, in conjunction with the valve, at the location of the hollow stand-tube via the height of the water in the hollow stand-tube.

\* \* \* \* \*